Figure 1:
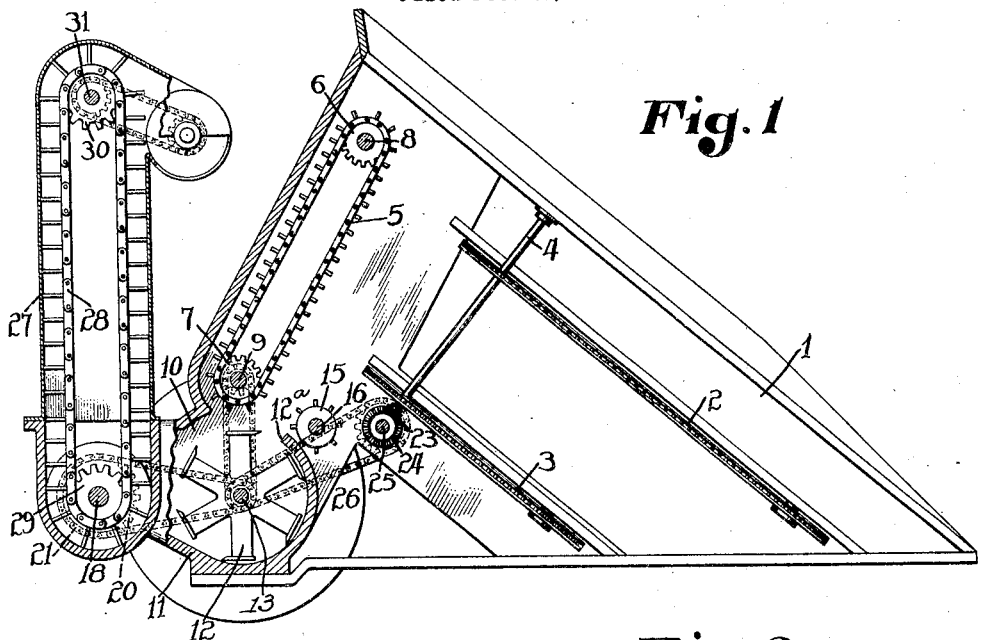

April 10, 1928. 1,665,401

F. BLECKE

ENSILAGE HARVESTER

Filed Dec. 11, 1926

Inventor

Fred Blecke

By Owen & Owen

Attorneys

Patented Apr. 10, 1928.

1,665,401

UNITED STATES PATENT OFFICE.

FRED BLECKE, OF LUCKEY, OHIO.

ENSILAGE HARVESTER.

Application filed December 11, 1926. Serial No. 154,162.

This invention relates to ensilage harvesters and has for an object the provision of a machine which is sturdy in construction and reliable in operation. More specifically, an object of this invention is to provide a machine of this character having a vertically disposed elevator in which there is no liability of the parts falling into the cutter, thereby eliminating a cardinal objection and fault of similar constructions heretofore in use. According to this invention, in the event of breakage of the elevator, the broken parts cannot find their way to the cutter, but are confined to one portion of the housing or conveyor remote from the cutter.

Another object is to provide a conveyor in rear of the cutter which is unaffected by the relatively great vibration of the machine while traveling, and will function efficiently to deliver cut material to the elevator for an extended period of time without requiring attention or inspection.

Other objects and advantages will hereinafter appear.

Figure 2:
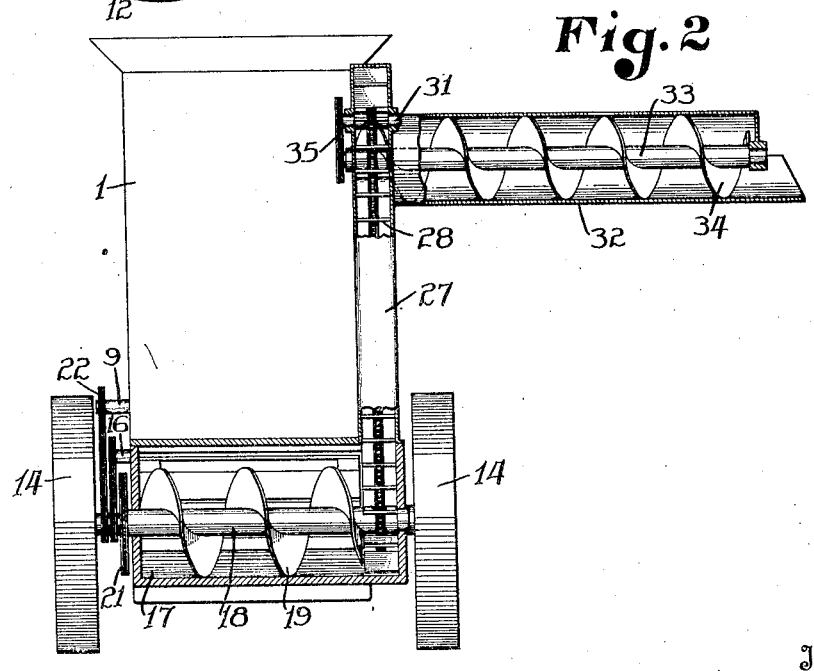

For purposes of illustration the invention is shown in the drawings, in which:

Fig. 1 is a vertical sectional view of an ensilage harvester, and Fig. 2 is an end view partly in section of the machine shown in Fig. 1.

The illustrated embodiment of the invention comprises a machine which is hauled across the field and is adapted to deliver corn stalks or other material to a rotary cutter which cuts the stalks into short lengths and delivers them to a transverse conveyor. The transverse conveyor discharges the cut stalks into an elevator which discharges them into a lateral conveyor. A wagon may be hauled along the field to receive the cut material discharged from the lateral conveyor. The above described machine is well known and a brief description thereof will suffice.

Referring to the drawings, a frame 1 is suitably connected to a tractor or other hauling power, and arranged therein are chain conveyors 2 and 3, which are inclined rearwardly from the forward part of the machine. One end of each chain is mounted on a sprocket connected to the shaft 4 in the casing. As the machine is hauled along the field the stalks are engaged by the chain conveyors 2 and 3 and delivered to the rear portion of the machine. Vertically disposed in the frame 1 is a chain conveyor 5 trained over sprockets 6 and 7 on shafts 8 and 9, respectively. The shafts 8 and 9 are suitably connected to opposite sides of the frame or housing 1. The chain conveyor 5 directs the corn stalks from the conveyors 2 and 3 downwardly into a cutting chamber 10.

The cutting chamber 10 is formed by an annular housing 11 having an opening or mouth 12ᵃ through which the corn stalks are delivered by the conveyor 5. Within the chamber 10 is a rotary cutter 12 having a plurality of radially disposed arms having cutting knives at the outer ends thereof. The cutter 12 is secured to a transversely arranged shaft 13, which is fixed at its opposite ends to traction wheels 14. It will be seen that as the machine is hauled over the field the wheels 14 rotate the cutter 12 and thereby cut the corn stalks into relatively short lengths.

A drum 15 having outwardly projecting teeth is disposed adjacent the mouth of the chamber 10, and assists in directing the corn stalks into the cutting chamber. The drum 15 is mounted on a shaft 16, which is mounted for rotation in opposite sides of the frame 1.

The corn stalks which have been cut by the rotary cutter 12 are thrown by a centrifugal force into a chamber 17 in the rear thereof. The chamber 17 is in communication with the chamber 10 throughout its length, and disposed within the chamber 17 is a transversely disposed shaft 18, having a helical vane 19. Rotation of the shaft 18 causes the cut material to be delivered to one end of the chamber 17. Secured to one end of the shaft 18 is a sprocket 20, which is connected by a chain 21 to a smaller sprocket on the cutter shaft 13, so that rotation of the cutter shaft 13 imparts rotation to the helical conveyor 19.

For driving the vertically disposed conveyor 5, a sprocket and chain connection 22 connects the cutter shaft 13 and conveyor shaft 9. As shown, the shaft 4 is provided with a beveled gear 23 at one end thereof meshing with a gear 24, which is fixed to a transverse shaft 25. The shaft 25 is connected to the cutter shaft 13 by a sprocket and chain connection 26.

It will be noted that the chamber 17 for the helical conveyor 19 is somewhat longer than the cutter chamber 10, and rising from the discharge end of the conveyor chamber 17, is an upright housing 27, in which is arranged an endless conveyor 28, which is driven by a sprocket 29 fixed to the conveyor shaft 18. The upper end of the conveyor 28 is trained around a sprocket 30 fixed to a transverse shaft 31.

Connected to the upper portion of the upright housing 27, forward of and below the shaft 31 is a laterally extending tubular housing 32 having an open outer end, from which the cut material may be discharged into a wagon or other suitable receptacle alongside the machine. Arranged within the tubular housing 32 is a shaft 33 having a helical vane 34. The inner end of the shaft 33 is connected by a chain and sprocket connection 35 to the shaft 31.

From the above description it will be seen that the corn stalks are delivered to the cutting chamber 10 by chain conveyors 2 and 3, and the vertically disposed conveyor, assisted by the toothed drum 16. The corn stalks are cut into small pieces by the rotary cutter 12 and delivered therefrom to the receiving or conveyor chamber 17. The helical vane 19 delivers the ensilage to one side of the chamber 17, and the elevator or vertically disposed chain conveyor 28 raises the material to the upper part of the housing 27, from which it drops into the tubular casing or housing 32. The helical vane 34 carries material from the conveyor 28, and discharges it through its open end.

An outstanding characteristic of this invention consists in the provision of the helical conveyors 19 and 34, which are sturdy and will not break or become inoperative due to the vibration of the machine. It will be understood that this machine is hauled over rough and irregular fields and the vibration to the machine is considerable, so that unless a conveyor is provided which will stand up under the hard usage and great vibration, breakage of the parts will quickly take place. Heretofore, considerable difficulty has been occasioned by breakage of the elevator and the parts thereof dropping into the rotary cutter, thereby causing breakage of the knives and throwing the entire machine out of use for a considerable period of time. Elevators of this type have been considerably longer than that shown on the drawing, and have been inclined from the vertical so that the vibration of the parts has been considerable, thereby resulting in frequent breakage of the parts. This is obviously costly, in that the machine is laid up for a considerable period of time for repairs and the cost of replacements is material. By means of my construction and arrangement, liability of breakage of the parts is reduced to a minimum.

A further advantageous feature of my construction resides in the positioning and supporting of the elevator so that whipping thereof during operation is materially reduced, thereby lengthening the life of the parts and reducing the operating cost. By my arrangement the sheet metal casing 27 is directly supported by the housing for the chamber 17, and while a slight amount of whipping or swaying of the elevating parts may take place during the operation of the machine, this is not sufficient to interfere materially with the efficient operation of the parts and constitutes a valuable improvement over constructions heretofore in use of which I am aware.

While I have shown and described one embodiment of my invention, it is to be understood that numerous changes in details of construction, arrangement and operation may be effected without departing from the spirit of the invention, especially as defined in the appended claims.

What I claim as new and desire to secure by Letters Patent is:

1. In an ensilage harvester, a casing having a chamber extending transversely of said casing, a shaft extending through said chamber, wheels mounted on the ends of said shaft, rotary cutter on said shaft, means for feeding ensilage to said chamber, a housing connected to said casing in rear thereof and having an interior in free communication with said chamber, an helical conveyor in said housing for delivering the material cut by said cutter to one side of the housing, a tube rising vertically from the discharge end of said housing, an endless conveyor in said tube for elevating the material from said casing, a tube extending laterally from the upper end of said vertical tube, and a helical conveyor in said tube.

2. In an ensilage harvester, a casing having a chamber extending transversely thereof, a shaft extending through said chamber, driving means for said shaft, a rotary cutter on said shaft, means for feeding ensilage to said chamber, a housing connected to said casing in rear thereof and having an interior in free communication with said chamber and so arranged that said rotary cutter expels the cut ensilage from the chamber directly into the housing, a conveyor within said housing for delivering the cut ensilage to one side thereof, a vertically disposed tube rising from the discharge end of said housing and an endless conveyor in said tube for elevating the material from the housing.

3. In an ensilage harvester, a casing having a chamber extending transversely thereof, a shaft extending through said chamber, wheels mounted on the ends of said shaft, a rotary cutter on said shaft, means for feeding ensilage to said chamber, a housing connected to said casing in rear thereof and having an interior in free communication with said chamber and so arranged that said rotary cutter expels the cut ensilage from the chamber directly into the housing, said housing being of slightly greater length than said chamber and having its discharge end spaced outwardly from the chamber, a conveyor within said housing for delivering the cut ensilage to one side thereof, a vertically disposed tube rising from the discharge end of said housing and an endless conveyor in said tube for elevating the material from the housing, whereby in case the endless conveyor should break, it will drop into the outwardly spaced discharge end of the housing without interfering with said first conveyor and rotary cutter.

In testimony whereof I have hereunto signed my name to this specification.

FRED BLECKE.